United States Patent [19]
Van Vessem et al.

[11] 3,782,173
[45] Jan. 1, 1974

[54] VISCOSIMETER

[75] Inventors: Cornelis J. Van Vessem, Bergen Op Zoom; Dirk J. F. Geerdes, Hogeheide, both of Netherlands

[73] Assignee: Akzo N.V., Arnhem, Netherlands

[22] Filed: June 2, 1972

[21] Appl. No.: 259,286

[30] Foreign Application Priority Data
June 3, 1971  Netherlands....................... 7107611

[52] U.S. Cl. .................................................. 73/56
[51] Int. Cl. ........................................... G01n 11/08
[58] Field of Search.................................. 73/56, 55

[56] References Cited
UNITED STATES PATENTS
3,680,362  8/1972  Geerdes et al.......................... 73/56
FOREIGN PATENTS OR APPLICATIONS
69,468  10/1969  Germany ............................... 73/55

Primary Examiner—Donald O. Woodiel
Assistant Examiner—Joseph W. Roskos
Attorney—Stevens, Davis, Miller & Mosher

[57] ABSTRACT

An apparatus for measuring the viscosity of a liquid product in a vessel, for instance, a reaction vessel, a dilution vessel and an evaporator, includes a) a measuring cell whose measuring chamber of constant volume is connected to a capillary, b) a conduit system communicating with the measuring chamber and having both a two-way valve for controlling the supply of a pressurized gas and a constriction for the pressurized gas, and c) a compensation device to compensate for variations in the liquid level and the gas pressure in the vessel.

6 Claims, 4 Drawing Figures

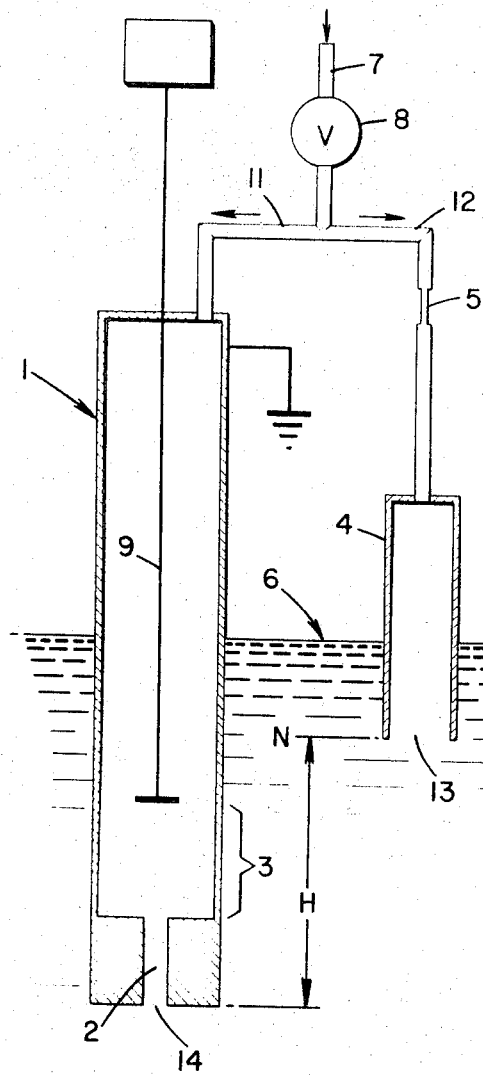
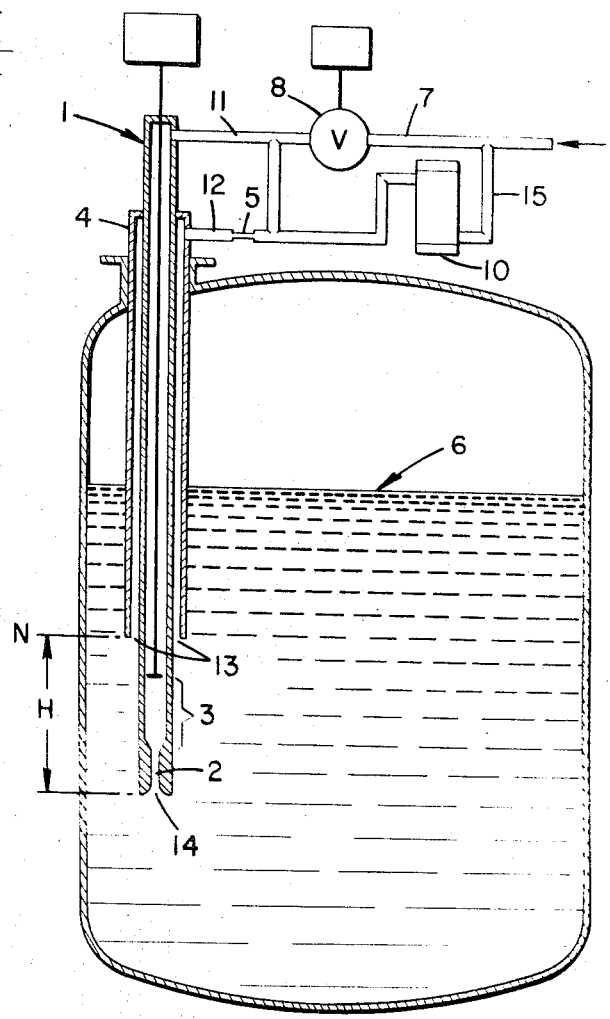

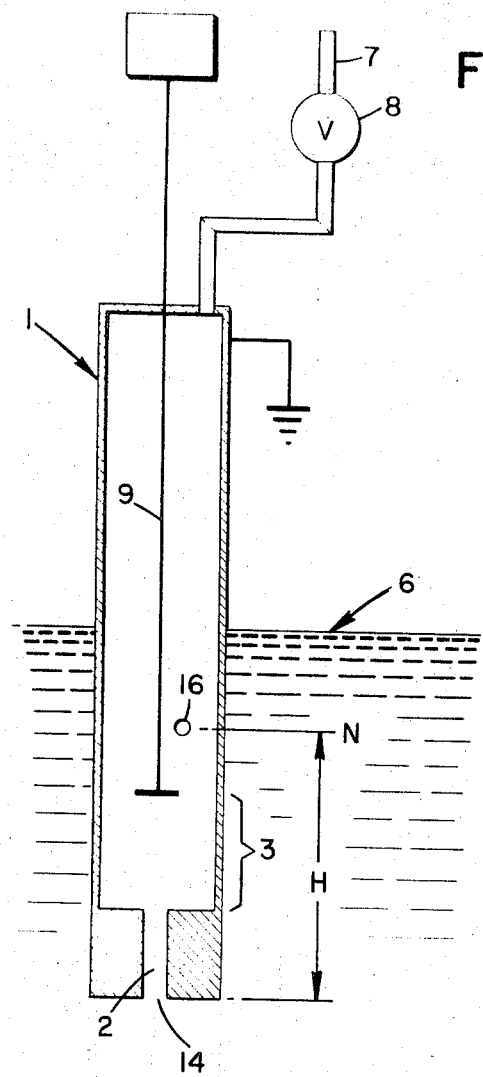
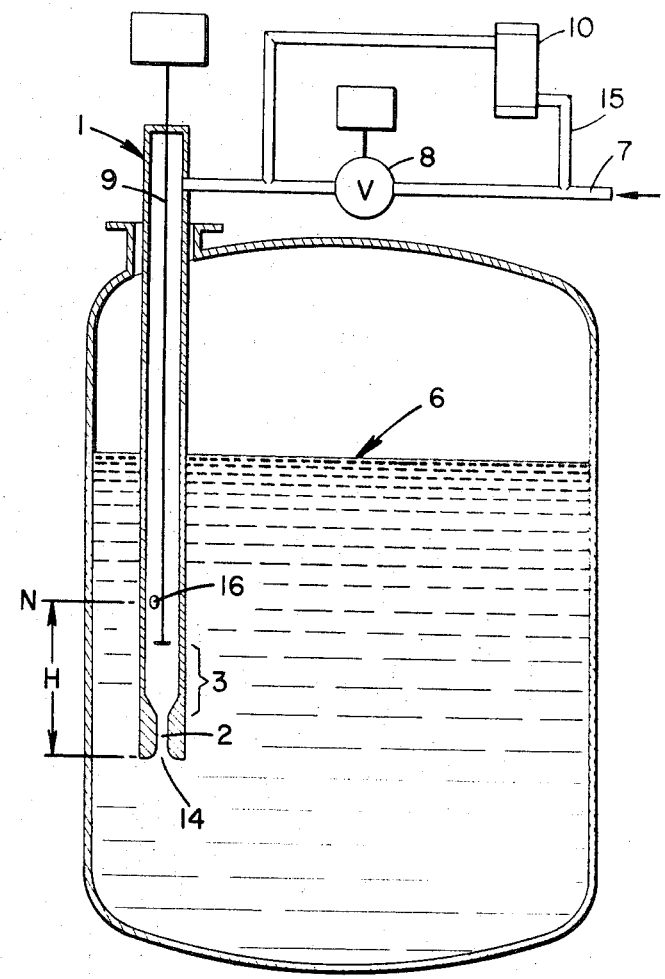

VISCOSIMETER

The invention relates to an apparatus for measuring the viscosity of a liquid product in a vessel.

Measuring the viscosity of a liquid product is in many chemical and physical processes an act of great importance in order to have the process controlled correctly. An example hereof is the preparation of synthetic resins, in which the viscosity as a rule increases during the polymerisation and/or condensation process. A final product of a certain resin type must show a viscosity within a determined range, mostly indicated for a certain concentration in an appropriate solvent to obtain the desired properties. It is clear that for the course of the reaction as well as for the determination of the end of the reaction, a quick and frequent measuring of the viscosity is of great importance.

An apparatus of the type indicated above permits carrying out in rapid succession a series of comparative determinations of the viscosity of a liquid product, for instance during a polymerization or condensation process while it remains immersed in the liquid to be measured and the level of the liquid in the vessel may vary. An embodiment of this type of apparatus has been described with reference to FIG. 3 of the U.S. patent application Ser. No. 20,374 filed Mar. 17, 1970 now U.S. Pat. No. 3,680,362 granted Aug. 1, 1972. With this viscosimeter the device for controlling the supply of gas must be in the form of a three-way valve in order that the measuring cell may entirely be emptied before a new measurement is started, during which measurement the measuring cell communicates with the compensation tube by means of the three-way valve. Under particular conditions, however, the three-way valve may become fouled which in its turn may give rise to the viscosity measurements becoming less accurate.

The present invention is concerned with a simplified embodiment which obviates the necessity of a three-way valve and need only be equipped with a two-way valve, if a particular part of the conduit system is fitted with a constriction for the gas under pressure.

The invention provides an apparatus for measuring the viscosity of a liquid product in a vessel, comprising a) a measuring cell which in use is at least partially immersed in the liquid product, the measuring cell having a measuring chamber of constant volume and a capillary which communicates with the measuring chamber, b) a conduit system communicating with the measuring chamber and having a device for controlling the supply of a gas under pressure with which the liquid product can be pressed out of the measuring chamber in a first stage of a measuring cycle, c) a compensation device to compensate for variations in the liquid level and the gas pressure in the vessel so that in a second stage of the measuring cycle, after said device for controlling the supply of gas has been closed, the measuring chamber fills up via the capillary with the liquid product under the influence of a pressure difference which is independent of the immersion depth of the measuring cell in the liquid, the gas contained in the measuring chamber escaping through an outlet provided in the conduit system, which outlet is located at a higher level than the outflow opening of the capillary, in which apparatus the device for controlling the supply of gas in the conduit system is a two-way valve and the part of the conduit system running from the two-way valve to just past said outlet has a constriction for the gas under pressure.

In a preferred embodiment of the apparatus the constriction is located in the part of the conduit system between the two-way valve and a compensation tube forming said compensation device, and the conduit system divides at a point between the two-way valve and the constriction into a line running to the compensation tube and a line running to the measuring cell. In this embodiment it is preferred that the compensation tube should surround the measuring cell. In this way a compact apparatus is obtained in which a constant vertical distance is ensured between the open end of the compensation tube and the outflow opening of the capillary.

In another preferred embodiment of the apparatus the constriction is formed by said outlet, which is located in the part of the wall of the measuring cell above the measuring chamber. In this embodiment the compensation tube may be conceived to coincide with the measuring cell, so that no separate compensation is required and there is only need for the aforedescribed outlet. The latter should have such a restricted diameter that the gas flowing to the measuring chamber will be given a pressure as will enable it to press the liquid out of the measuring chamber. The outlet has a diameter whose area approximately corresponds to that of the constriction of the first-mentioned embodiment.

In the two afore-described embodiments of the apparatus according to the invention it is preferred that the part of the conduit system between the two-way valve and the constriction connects with a line in which there is a rotameter through which a continuous relatively small flow of gas may be kept up passing through at least part of the apparatus.

Just as in the case of the viscosimeter described in the aforementioned U.S. Pat. 3,680,362 the viscosimeter permits recording the time required for the liquid to cover the distance between two set levels in the measuring chamber. In principle it is conceivable that this can be observed visually. In that case the wall of the vessel need, of course, be provided with a sight glass and the viscosimeter itself must be transparent. In practice, however, it is preferred that the time interval between the beginning and the end of the measuring procedure is recorded as a result of electric pulses that are produced at the beginning and at the end of the measurement. These pulses can also be utilized for operating the valve which serves to initiate a new measuring cycle. The electric pulses may be produced in any suitable manner, for instance, by carrying out a capacitive or conductivity measurement.

Some specific embodiments of the invention together with some variants thereof will now be described by way of example with reference to the accompanying drawings, in which:

FIG. 1 is a schematic representation of an apparatus according to the invention, FIG. 2 shows a different embodiment of the apparatus according to the invention, FIG. 3 is again a different embodiment of an apparatus according to the invention, and FIG. 4 represents a variant embodiment of the apparatus according to FIG. 3.

In the Figures the numeral 6 refers to the level of a liquid contained in a vessel, of which liquid the viscosity is to be measured. Immersed in the liquid is a tubular measuring cell 1 which has a measuring chamber 3 with a fixed volume, and a capillary 2 leading thereto. Connected to the measuring cell 1 is a conduit system comprising a supply line 7 and a device, in the form of a two-way valve 8, for controlling the passage of a gas.

In the embodiment according to the FIGS. 1 and 2, the conduit system also includes a line 11 which connects the measuring cell 1 with the two-way valve 8, and a compensation tube 4 which is partly immersed in the liquid, and which is connected to the two-way valve 8 through a line 12 in which there is a constriction 5. An open lower end 13 of the compensation tube 4 forms an outlet opening for the conduit system and is located at a higher level than an outflow opening 14 of the capillary 2. Inserted in the measuring cell 1 is a capacitive electrode 9 whose lower end forms the upper boundary of the measuring chamber 3. The wall of the measuring cell 1 forms a second capacitive electrode. Both electrodes are connected to a time recorder for measuring the flow time of the liquid passing through the capillary 2.

Whereas the compensation tube 4 shown in FIG. 1 is positioned separate from the measuring cell 1, the compensation tube 4 in the construction according to FIG. 2 surrounds the measuring cell 1. The construction according to FIG. 2 moreover comprises a bypass 15 having a rotameter 10.

The constructions according to FIGS. 3 and 4 differ from those shown in FIGS. 1 and 2 in that they do not include the line 12, the constriction 5 or the compensation tube 4 as such; instead the part of the measuring cell 1 above an outlet 16 serves as compensation tube.

The constructions according to the FIGS. 1 and 2 operate as follows: In a first stage of a measuring cycle the two-way valve 8 is opened, so that pressurised gas is admitted to the conduit system. The two-way valve 8 remains open for a predetermined period. The gas now flows through the line 11 into the measuring cell 1 and through the line 12 and the constriction 5 into the compensation tube 4. Owing to the presence of the constriction 5 the pressure in the measuring cell is higher than that in the compensation tube 4, as a result of which the measuring chamber 3 and the capillary 2 can be emptied completely, after which the two-way valve closes under the influence of a pulse which also actuates the time recorder. In this way a second stage of the measuring cycle is started.

Subsequently, under the influence of static pressure, whose initial value is always determined by the fixed difference in level between the openings 13 and 14, the liquid will flow from the vessel through the capillary 2 into the measuring chamber 3. The gas displaced thereby flows from the measuring cell 1 to the compensation tube 4 and escapes through the opening 13. While the liquid is flowing into the measuring chamber 3, the capacitance measured between the electrode 9 and the wall of the measuring cell will not change until the liquid comes into contact with the electrode 9 after which it begins to fill up the space between the electrode 9 and the wall of the measuring cell. As a result, the gas will be replaced with liquid, which as a dielectric is different from water and therefore causes a change in capacitance. The electric pulse produced by this change in capacitance stops the time recorder. The elapsed time registered by the time recorder serves as a measure of the viscosity.

A further increase of the liquid level in the measuring cell 1 will be attended with a progressing change in capacitance. As soon as this change has reached a particular value which corresponds to a pre-set value, a fresh electric pulse will be produced, as a result of which the two-way valve is opened again and a fresh measuring cycle is started.

In the simplified constructions according to the FIGS. 3 and 4 operation will be such that in the first stage of the measuring cycle gas under pressure will flow into the measuring cell 1, displacing the liquid contained therein. Part of the gas will escape through an outlet 16. The area of this outlet, however, it so restricted that in the measuring cell 1 sufficient pressure is maintained for the latter to be completely emptied. Here the outlet 16 has the functions of the constriction 5 and the outlet 13 shown in the FIGS. 1 and 2. In the second stage of the measuring cycle, after the two-way valve 8 has been closed, liquid will flow from the vessel through the capillary 2 into the measuring chamber 3 under the influence of static pressure. In this embodiment the initial value of the static pressure is determined by the fixed level difference H between the openings 14 and 16.

We claim:

1. An apparatus for measuring the viscosity of a liquid product contained in a vessel, comprising:
    a. a measuring cell mounted in said vessel, partly below and partly above the liquid level in the vessel, which cell includes a measuring chamber of constant volume, a space above the measuring chamber and a capillary below the measuring chamber and communicating therewith,
    b. means for supplying a gas under pressure, and
    c. a conduit system between at least part of the measuring cell and the gas supply means, comprising a two-way valve communicating with the gas supply means and provided for controlling the direction of flow of the gas either into or out of the measuring cell during a liquid emptying or liquid filling cycle respectively, a pressure compensation tube communicating with the measuring cell and reaching to below the liquid level in the vessel, of which tube the lower end is at a level which differs a predetermined distance from that of the lower end of the capillary, and
    d. a constriction arranged in series with said compensation tube for limiting the quantity of gas leaving the compensation tube at its lower end during the liquid emptying cycle.

2. The apparatus according to claim 1, wherein the conduit system comprises a pressure compensation tube including an inner space above the liquid level in the vessel, a connecting line connecting the inner space of the pressure compensation tube with the space in the measuring cell above the measuring chamber, a construction in the connecting line, a supply line for supplying the gas to the connecting line at a point between the constriction and the connection of the connecting line with the space in the measuring cell, and a two-way valve in the supply line for controlling the direction of flow of the gas either into or out of the measuring cell during the liquid emptying or filling cycle respectively.

3. The apparatus according to claim 1, wherein the conduit system comprises a pressure compensation tube surrounding the measuring cell, said compensation tube including an inner space above the liquid level in the vessel, a connecting line connecting the inner space of the pressure compensation tube with the space in the measuring cell above the measuring chamber, a constriction in the connecting line, a supply line for supplying the gas to the connecting line at a point between constriction and the connection of the connecting line with the space in the measuring cell, and a two-way valve in the supply line for controlling the direction of flow of the gas either into or out of the measuring cell during the liquid emptying or filling cycle respectively.

4. The apparatus according to claim 1, wherein the measuring cell comprises an outlet opening situated below the liquid level and above the measuring chamber, the part of the measuring cell above the outlet opening constituting the pressure compensation tube and the outlet opening the constriction, the measuring cell being connected to a supply line which supplies the gas under pressure to the space above the measuring chamber and the two-way valve being accomodated in the supply line and being opened during the liquid emptying cycle and closed during the liquid filling cycle.

5. The apparatus according to claim 1, comprising a line bypassing the two-way valve, in which line a rotameter is provided through which there continuously passes a relatively small flow of gas.

6. An apparatus for measuring viscosity of a liquid comprising
   a. a measuring cell disposed with one end thereof submerged in the liquid and the second end above the liquid, said cell having a chamber of constant volume defined by the wall of the cell, said submerged end and a capacitive electrode disposed in the measuring cell, said wall serving as a second capacitive electrode, a capillary through said submerged end communicating between the said constant volume chamber and liquid outside the measuring cell, said electrodes being connected to a time recorder for measuring flow of liquid passing through said capillary;
   b. a pressure compensation tube having an open end submerged in the liquid at a level above the level of said submerged end of the measuring cell and a second end;
   c. a conduit between said second end of the measuring cell and the said second end of the compensation tube;
   d. means for supplying a gas under pressure to said conduit comprising a two-way valve for controlling the direction of flow of gas into and out of the measuring cell as liquid enters and leaves the measuring cell; and
   e. a constriction disposed in said conduit between said compensation tube and the point where gas supply means is attached to the conduit for limiting the quantity of gas leaving the compensation tube through its submerged open end as liquid leaves the measuring cell.

* * * * *